United States Patent [19]

Franke et al.

[11] Patent Number: 4,663,261

[45] Date of Patent: May 5, 1987

[54] ELECTROPHOTOGRAPHIC RECORDING MATERIAL CONTAINING ZINC OXIDE AND CYANINE SENSITIZER

[75] Inventors: Werner Franke, Wiesbaden; Richard Brahm, Ingelheim, both of Fed. Rep. of Germany

[73] Assignee: Hoechst Aktiengesellschaft, Frankfurt am Main, Fed. Rep. of Germany

[21] Appl. No.: 701,230

[22] Filed: Feb. 13, 1985

[30] Foreign Application Priority Data

Feb. 16, 1984 [DE] Fed. Rep. of Germany ....... 3405487

[51] Int. Cl.$^4$ .............................................. G03G 5/09
[52] U.S. Cl. ..................................................... 430/93
[58] Field of Search .............................. 430/93, 73, 74

[56] References Cited

U.S. PATENT DOCUMENTS

| | | | |
|---|---|---|---|
| 2,503,776 | 4/1950 | Sprague | 546/177 |
| 3,052,540 | 9/1962 | Greig | 430/91 |
| 3,241,959 | 3/1966 | Kendall et al. | 430/92 |
| 3,730,714 | 5/1973 | Bird et al. | 430/66 |
| 3,852,067 | 12/1974 | Levy | 430/93 |
| 3,865,587 | 2/1975 | Noe | 430/8 |
| 4,063,948 | 12/1977 | Lind | 430/83 |
| 4,138,266 | 2/1979 | Hinata et al. | 96/123 |
| 4,386,146 | 5/1983 | Kishino et al. | 430/95 |

FOREIGN PATENT DOCUMENTS

| | | |
|---|---|---|
| 704141 | 3/1941 | Fed. Rep. of Germany . |
| 1772318 | 7/1976 | Fed. Rep. of Germany . |
| 3319654 | 12/1984 | Fed. Rep. of Germany . |
| 1020504 | 2/1966 | United Kingdom . |
| 1200091 | 8/1970 | United Kingdom . |

*Primary Examiner*—John L. Goodrow
*Attorney, Agent, or Firm*—Schwartz, Jeffery, Schwaab, Mack, Blumenthal & Evans

[57] ABSTRACT

An electrophotographic recording material is disclosed which comprises an electrically conductive support and a photoconductive layer containing a photoconductor comprised of zinc oxide, a binder, and a sensitizing agent comprised of an alkylated trimethine-cyanine dye having a particular structure. The disclosed electrophotographic material possesses a sharply pronounced, selective sensitization having a peak at about 495 nm, and can be safely handled under green, yellow and red safelights.

6 Claims, 1 Drawing Figure

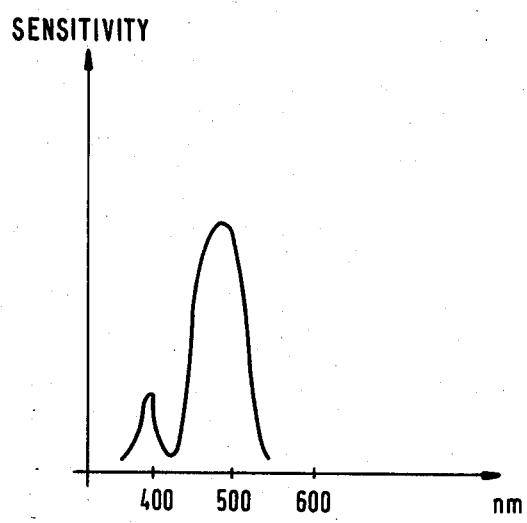

ELECTROPHOTOGRAPHIC RECORDING MATERIAL CONTAINING ZINC OXIDE AND CYANINE SENSITIZER

BACKGROUND OF THE INVENTION

The present invention relates to an electrophotographic recording material comprising an electrically conductive support and a photoconductive layer which comprises a photoconductor, a sensitizing dye, a binder, and customary additives.

In electrophotographic reproduction processes, it is known to use layers comprising zinc oxide as the photoconductor, zinc oxide having a spectral sensitivity in the region of long-wave ultraviolet light, from about 350 nm to about 400 nm. In order to extend the range of spectral sensitivity, these layers are provided with dyes of different chemical types. Such dyes include triphenylmethane dyes, diarylmethane dyes, monomethine cyanines, trimethine cyanines, styryl dyes, oxonols, merocyanines, complex cyanines, azenium dyes, azo dyes, anthraquinone dyes, indigo dyes, vinylene dyes, anthraquinone dyes, indigo dyes, vinylene dyes, azomethines (see e.g., British Pat. No. 1,020,504 and U.S. Pat. No. 3,052,540). Examples of dyes belonging to these classes are Rose Bengale (C.I. 45,440), Acridine Orange (C.I. 46,005), Rhodamine B (C.I. 45,170), Eosin (C.I. 45,380), Fluorescein-Na salt (C.I. 45,350), Brilliant Green (C.I. 42,040) and Pinacyanol (C.I. 808). Other dyes which are used for sensitizing are disclosed in British Pat. No. 1,200,901, U.S. Pat. No. 3,241,959 and German Pat. No. 2,235,408.

German Pat. No. 2,526,720 (corresponding to U.S. Pat. No. 4,063,948) discloses an electrophotographic recording material with an electrically conductive support, which material is used to produce printing plates or printed circuits. The disclosed material comprises a photoconductive layer containing cyanine dyes represented by the formula

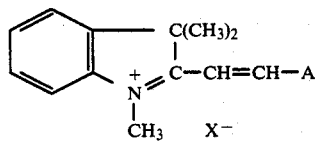

wherein a is an unsubstituted or substituted indolyl group, phenylamino group, or an indolinyl group and $X^-$ is a monovalent anion. The aforementioned cyanine dyes act with organic photoconductors in the shortwave orthochromatic region, but they are ineffective when used with photoconductor layers comprising zinc oxide.

Other sensitizations achieved in zinc oxide-based photoconductor layers often have the disadvantage that they show a very wide range of spectral sensitization, a phenomenon which particularly occurs, for example, when Eosin, Bromophenol Blue or Rhodamine are used. In addition, residual staining of the photoconductive layer, or of support material comprising, for example, paper, presents another disadvantage. As a result, the recording material has a reduced darkroom safety.

It is also a disadvantage that the sensitization peak is sometimes not sharply pronounced. Frequently, the sensitization peak is not in the region of the strongest emission of the light source used for exposure, which is of critical importance, for example, in a recording material which is to be exposed to laser radiation. In addition, the spectral photosensitivity may often be increased, but the overall sensitivity is reduced or is not improved. In many cases, an adequate sensitization can only be achieved by adding relatively large amounts of dyes, which may impair the chargeability and dark resistivity of the layer. The dyes used also often severely stain the photoconductive layer, which is inconvenient in some fields of application, for example, in copying papers and scaled papers.

SUMMARY OF THE INVENTION

It is therefore an object of the present invention to provide a dye for sensitizing zinc oxide-based photoconductor layers, which dye displays a steep drop of spectral photosensitivity toward the longer-wavelength region, and which is distinguished by a pronounced sensitization peak in the region of about 500 nm.

It is another object of the present invention to provide a sensitization agent for electrophotography which imparts an intensive spectral photosensitivity to zinc oxide-based photoconductor layers without giving rise to inconvenient residual staining.

It is also an object of the present invention to provide an electrophotographic recording material which can be safely handled in green, yellow and red light, and be processed under visual control.

In accomplishing the foregoing objects, there has been provided, in accordance with one aspect of the present invention, electrophotographic recording material, which comprises an electrically conductive support and a photoconductive layer comprising a photoconductor comprised of zinc oxide, a binder, and a sensitizing agent comprised of a compound represented by the formula:

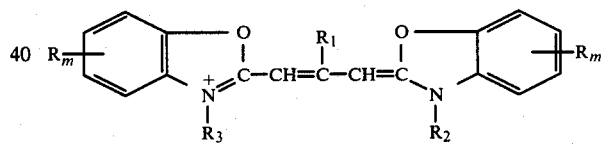

wherein
R denotes chlorine or bromine,
m is 1 or 2,
$R_1$ denotes an alkyl group having from 1 to 3 carbon atoms
$R_2$ denotes $-(CH_2)_n-SO_3H$ or $-(CH_2)_2-COOH$,
$R_3$ denotes $-(CH_2)_n-SO_3^-$, or $-(CH)_2-COO^-$, and
n is 3 or 4.

In one embodiment of the aforementioned recording material, the sensitizing agent comprises a compound represented by the formula

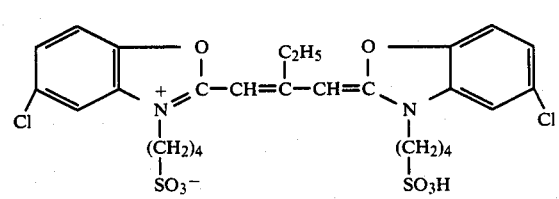

Electrophotographic recording material of the present invention can be safely handled in green, yellow, and red safelights, possesses a sharply pronounced selective sensitization having a peak at about 495 nm, and shows a very steep drop of the sensitization spectrum toward the longer-wavelength region of the spectrum.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The accompanying FIGURE presents the sensitization spectrogram for a zinc-oxide based layer sensitized according to the present invention.

DETAILED DESCRIPTION OF THE PREFERRED EMBODIMENTS

Many cyanine dyes, known from photography, are capable of effecting a spectral sensitization of silver halide. In contrast, sensitization is often only slight or nonexistent when these dyes are used for electrophotographic recording materials. Sensitizing dyes which effect sensitization in layers comprising organic photoconductors are often absolutely ineffective in photoconductive layers comprising an inorganic photoconductor, and vice versa.

An electrophotographic recording material, in which sensitizing dyes of the aforementioned kind are effectively used in a photoconductive layer containing an organic photoconductor, has already been proposed in German patent application file No. 3,319,654.0. However, it was impossible to conclude from this that the sensitizing dyes of the invention could also advantageously be used in combination with photoconductive layers comprising zinc oxide as the photoconductor.

The sensitizing dyes employed according to the present invention have the advantage of displaying an intensive and narrow sensitization spectrum which has an acute peak at about 495 nm and a pronounced steep drop toward the longer-wavelength spectral region. This ensures high darkroom safety under longer-wavelength light, starting from about 530 nm. Accordingly, a higher degree of safety and an improved quality of the resulting products are additionally achieved, since operations can be visually controlled and working conditions are thus improved. The recording material is therefore very suitable for irradiation with argon ion lasers which emit at 488 nm (514 nm) and for use with light sources emitting at similar wavelengths.

The spectrogram shown in the accompanying FIGURE was produced by exposing electrophotographic material sensitized in accordance with the present invention to the light from a xenon high-pressure lamp XBO 150/1 through a variable interference filter VERIL R-60, No. B 71542.14, using a gray scale and toner development. The very steep drop toward the longer-wavelength portion of the spectrum and the strongly pronounced selective peak are clearly recorded.

The recording material of the present invention is, for example, suitable for use in the production of papers for oscillographic recordings, and in the production of printing plates which are processed in automatic machines for the manufacture of rotary offset printing plates (e.g., LASERITE®RE, manufactured by HOECHST AG). The material is also suitable for use as a proof sheet in the exposure of printing plates to laser radiation. Compared with recording materials having organic photoconductor layers, it is, in many cases, a particular advantage of the recording material of this present invention is a high sensitivity, resulting from the inherently higher basic sensitivity of the inorganic photoconductor layers, in combination with an intensive spectral sensitization.

The sensitizing dyes according to the present invention can be prepared as indicated in German Pat. No. 704,101 or in U.S. Pat. No. 2,503,776.

The concentration of the sensitizing dyes of the present invention depends on the photoconductor layer used in each individual case, on the desired effect, and also on the sensitizing dyes used. Usually, the sensitizing dye is added in an amount of from about 0.01 to 5% by weight, preferably from about 0.05 to 0.5% by weight, based on the weight of the photoconductor used.

The recording material, in which charge generation and charge transfer can be effected in a single photoconductive layer or in several layers, comprises photoconductors based on ZnO. The particle size of the photoconductive zinc oxide is, for example, from 0.1 to 15 $\mu$m.

The photoconductive layer which contains a suitable, insulating binder or a binder mixture preferably has a specific resistance which ranges between approximately $10^7$ and $10^{14} \Omega \cdot cm$.

It is possible to use any polymeric or resinous binder or a mixture of polymeric binders, which have been disclosed in the prior art for use in electrophotographic layers containing photoconductive zinc oxide. The photoconductive layer may contain from 50% to 97% by weight of the photoconductive particles, based on the weight of the binder. A preferred weight ratio binder:particles ranges between 1:4 and 1:10.

Suitable binders have a resistance which is higher than the inherent resistance of the photoconductive zinc oxide particles. Binders which may be used include, for example, electrically insulating, organic, resinous binders, such as polyurethanes, polyesters, polycarbonates, polystyrenes, chlorinated rubber, acrylic resins, alkyd resins, silicone resins, and vinyl acetate copolymers, for example, vinyl chloride acetate resin.

The photoconductive layers may be applied from an organic solvent or a solvent mixture, from an emulsion prepared from organic solvents and water, or from an aqueous medium.

The supports used for the recording material may have a planar or cylindrical shape and may comprise a metal plate, a metal foil, metallized papers or metallized plastic films, electrically conductive papers, plastic films coated with an electrically conductive plastic material, or bases which have been rendered conductive by other means, as is known in the art.

Toner images can be produced in a known manner directly on the recording material of the present invention. It is, also possible however, to transfer either the charge image generated or the toner image to an image receptor.

The electrophotographic recording material of the present invention may further comprise customary additives, such as leveling agents and plasticizers which are added to the photoconductive layer and/or adhesion promoters which are applied between the support and the photoconductive layer.

The invention will be further illustrated by the following examples, which are intended to be illustrative only and in no sense limiting.

EXAMPLE 1

A highly wet-resistant base paper, which had a basis weight of about 100 g/m² and a reverse side which had been coated with a binder layer containing carbon black particles to render it electrically conductive, was provided with a barrier layer for organic solvents on its front side and then was calendered. The image-receiving layer was prepared as follows: 100 parts by weight of photoconductive zinc oxide were mixed with 40 parts by weight of a 50% strength solution of a modified copolymer of vinyl acetate in toluene. The mixture was ground for about three hours in a ball mill and then coated upon the paper support using a wire-wound doctor, to give a dry layer weight ranging between 25 and 30 g/m². The coating solution had been admixed with 50 mg of the sensitizing dye represented by the following formula:

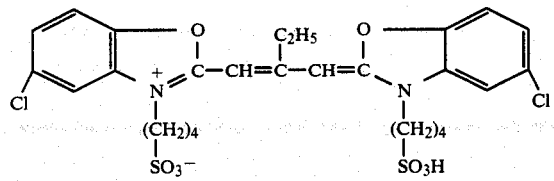

The layer was charged with a corona (voltage 5 kV negative, distance 25 mm) and then imaged.

The material did not show any inconvenient residual staining and displayed a pronounced, selective sensitization with a peak at 500 nm and a steep drop toward the long-wave portion of the spectrum.

EXAMPLE 2

A coating solution as described in Example 1 was coated upon a 100 μm thick aluminum foil. The photoconductive layer which resulted after evaporation of the solvent was about 5 μm thick.

The layer was charged with a corona and then imaged in a conventional automatic machine for the production of printing plates, using an argon ion laser operating in the power range from 0.2 to 0.5 mW (rated power 50 mW, output 15 mW), at a feed of 400 lines/cm, and with further treatment according to the method which is customarily used for zinc oxide printing plates.

The printing plate thus obtained displayed a selective spectral sensitivity with a peak at 500 nm and a steep drop toward the long-wavelength portion of the spectrum, as can be seen from the accompanying FIGURE, and it was distinguished by its high darkroom safety.

For comparison, a recording material was prepared which contained the cyanine dye Astrazone Orange R (C.I. 48,040), according to German Pat. No. 2,526,720, instead of the sensitizing dye of the present invention. The sensitizer was ineffective. The material could not be imaged.

EXAMPLE 3

To produce a scaled paper for writing with argon ion lasers, a paper base according to Example 1 was coated with a layer which contained zinc oxide and a copolymer of vinyl acetate and maleic acid as a binder and which had been sensitized as described in Example 1.

The paper was practically free from any residual staining, whereas reference papers which had been sensitized with a mixture of Bromophenol Blue (50 mg), Fluorescein (50 mg), Rose Bengale (270 mg), and Eosin (400 mg), relative to 100 g of zinc oxide, showed a strong red residual staining. The recording material of the present invention could be processed in red light and even in yellow light without damaging the image, while in the reference material treated in the same manner the image or the recorded characteristic either disappeared or showed a noticeable fading.

What is claimed is:

1. Electrophotographic recording material which comprises an electrically conductive support and a photoconductive layer comprising (i) a photoconductor comprised of zinc oxide, (ii) a binder, and (iii) a sensitizing agent comprised of a compound represented by the formula:

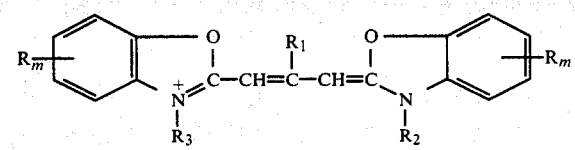

wherein
R denotes chlorine or bromine,
m is 1 or 2,
$R_1$ denotes an alkyl group having from 1 to 3 carbon atoms,
$R_2$ denotes —(CH$_2$)n—SO$_3$H or —(CH$_2$)$_2$—COOH,
$R_3$ denotes —(CH$_2$)$_n$—SO$_3^-$ or —(CH$_2$)$_2$—COO$^-$, and
n is 3 or 4,
such that said recording material possesses a selective sensitization having a peak at about 495 nm, whereby said recording material is suitable for irradiation with light-sources emitting in the wavelength range of an argon ion laser.

2. A recording material as claimed in claim 1, wherein said sensitizing agent comprises a compound represented by the formula:

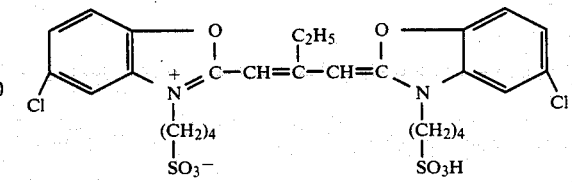

3. A recording material as claimed in claim 1, wherein said compound is present in quantities ranging from 0.05 to 0.5% by weight, based on the weight of said photoconductor.

4. A recording material as claimed in claim 1, wherein said peak precedes a pronounced drop toward the longer-wavelength spectral region.

5. A recording material as claimed in claim 1, wherein said peak is at 500 nm.

6. A recording material as claimed in claim 1, wherein said photoconductive layer consists essentially of said photoconductor (i), said binder (ii) and said sensitizing agent (iii).

* * * * *